(12) United States Patent
McDougal et al.

(10) Patent No.: US 8,417,046 B1
(45) Date of Patent: Apr. 9, 2013

(54) SHADOW AND HIGHLIGHT IMAGE ENHANCEMENT

(75) Inventors: Jay McDougal, Corvallis, OR (US);
Brian Watson, Dallas, OR (US);
Pamela Voss, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 732 days.

(21) Appl. No.: 12/576,501

(22) Filed: Oct. 9, 2009

Related U.S. Application Data

(60) Provisional application No. 61/112,888, filed on Nov. 10, 2008.

(51) Int. Cl.
*G06K 9/40* (2006.01)

(52) U.S. Cl.
USPC ........................................... 382/254

(58) Field of Classification Search .............. 382/254, 382/273, 274, 108; 358/3.26, 3.27, 522, 358/530
See application file for complete search history.

(56) References Cited

U.S. PATENT DOCUMENTS

| | | | |
|---|---|---|---|
| 5,818,975 A | 10/1998 | Goodwin et al. | |
| 7,006,668 B2 | 2/2006 | Iguchi et al. | |
| 7,072,523 B2 * | 7/2006 | Bolle et al. | 382/254 |
| 7,146,059 B1 | 12/2006 | Durand et al. | |
| 7,280,705 B1 | 10/2007 | Frank et al. | |
| 7,539,342 B2 | 5/2009 | Tabata et al. | |
| 7,738,727 B2 | 6/2010 | Chang et al. | |
| 7,969,456 B2 * | 6/2011 | Brown et al. | 345/694 |
| 7,999,858 B2 | 8/2011 | Nayar et al. | |
| 2001/0007599 A1 | 7/2001 | Iguchi et al. | |
| 2002/0135743 A1 | 9/2002 | Gindele | |
| 2005/0100242 A1 | 5/2005 | Trifonov et al. | |
| 2005/0169533 A1 * | 8/2005 | Paragyios | 382/203 |

* cited by examiner

*Primary Examiner* — Yon Couso

(57) ABSTRACT

Embodiments provide techniques for enhancing an existing image after image acquisition. These techniques include sub-sampling the original image, identifying and/or deriving local region brightness, and using the local region brightness to enhance the contrast of pixels within these regions in the original image. Sub-sampling is generally used to reduce the number of pixels and corresponding computational load. Local region brightness is localized brightness in an image determined based on the dark and light regions within the image by, for example, using a 2-D Gaussian filter. The use of the local region brightness to enhance the image may be accomplished using a lookup table that may be configured to implement a variety of techniques, for example, contrast overlay, Alpha blending, and the like, for contrast enhancement in the dark and light regions.

20 Claims, 6 Drawing Sheets

SHADOW AND HIGHLIGHT IMAGE ENHANCEMENT

CROSS REFERENCE TO RELATED APPLICATIONS

The present non-provisional application claims priority to provisional application 61/112,888, filed on Nov. 10, 2008, titled "Digital Image Shadow and Highlight Enhancement." The specification of said provisional application is hereby incorporated by reference in its entirety for all purposes except for those sections, if any, that are inconsistent with this specification.

TECHNICAL FIELD

Embodiments herein relate to the field of image processing, and more specifically, to image shadow and highlight enhancement.

BACKGROUND

With the advent of digital computing, including digital photography, there has been an explosion in the amount of digital images, such as photographs and video, that are generated and transmitted by electronic imaging equipment, such as digital cameras, camcorders, copiers, scanners, PDAs (Personal Digital Assistant), cell-phones, and the like. A great deal of such images are created by amateur photographers using imaging equipment with limited dynamic range (difference between highest and lowest values of a variable quantity such as light intensity or frequency), under unsuitable and/or non-optimal lighting conditions.

One of the image quality shortcomings in many images, such as photographs, is that when a poorly lit scene is captured, some of the original scene detail is lost in the regions of the image that are dark (shadows) and/or bright (highlights) compared with other regions of the image. This is particularly notable when a scene contains mixed lighting where there are combinations of shadows, highlights, and medium regions that are captured in a single image. This shortcoming may be caused by the limited dynamic range and/or imperfect exposure settings of the image capture device, among other causes.

A variety of techniques have been used to address such shortcomings. One technique to enhance an image is to adjust the lighting of the original scene so that there is limited dynamic range in the scene that is to be captured, for example, by eliminating overly dark and/or overly bright areas in the scene. Other than in a studio where lighting may be adjusted professionally, adjusting the lighting of a scene may be difficult at best and impossible at worst because of lack of control of the scene, equipment, knowledge or any combination thereof.

Another technique to improve an image is to capture the scene with a device capable of representing the full dynamic range of the scene. This technique also presents limited opportunities for improvement due to unavailability of suitable equipment, time constraints, lack of control over the scene or equipment, and the like. Additionally, the quality of a captured image is generally not known until after it has been captured.

Still another technique to enhance a captured image is to post-process the captured image to enhance the detail of the overly dark and/or bright regions of the image. Processing an image after image acquisition is usually possible and desirable in most circumstances because the constraints for post-processing are fewer. However, most conventional image processing methods need a great deal of computational resources, such as processing power and memory. Furthermore, such conventional image processing techniques typically produce undesirable visual artifacts and/or may only address the enhancement of the shadow/dark regions or the highlight/bright regions, but not both in the same image.

SUMMARY

In one aspect of the disclosure, a method of enhancing an image is disclosed. An original image is sub-sampled to generate a sub-sampled image with sub-sample pixels. Maximum intensity is obtained for each of the sub-sample pixels. The sub-sampled image is blurred to generate an image base layer based on the maximum intensities of the sub-sample pixels. Dark and bright regions within the image base layer are identified and applied to the original image to enhance a contrast of pixels within the original image.

In another aspect of the disclosure, an apparatus for enhancing an image is disclosed including a processor and a storage device. The storage device includes instructions that cause the apparatus to sub-sample an original image to generate a sub-sampled image having sub-sample pixels. The apparatus obtains a maximum intensity for each of the sub-sample pixels and blurs the sub-sampled image to generate an image base layer based on the maximum intensities. The apparatus further identifies dark and bright regions within the image base layer and applies the dark and bright regions to the original image to enhance a contrast of pixels within the original image.

In yet another aspect of the disclosure, a method of enhancing an image is disclosed. A maximum intensity is obtained for each of a plurality of pixels in an original image. The original image is then blurred to generate an image base layer based on the maximum intensities. Dark and bright regions are identified within the image base layer and applied to the original image based on at least one of several techniques stored within a table to enhance a contrast of pixels within the original image.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
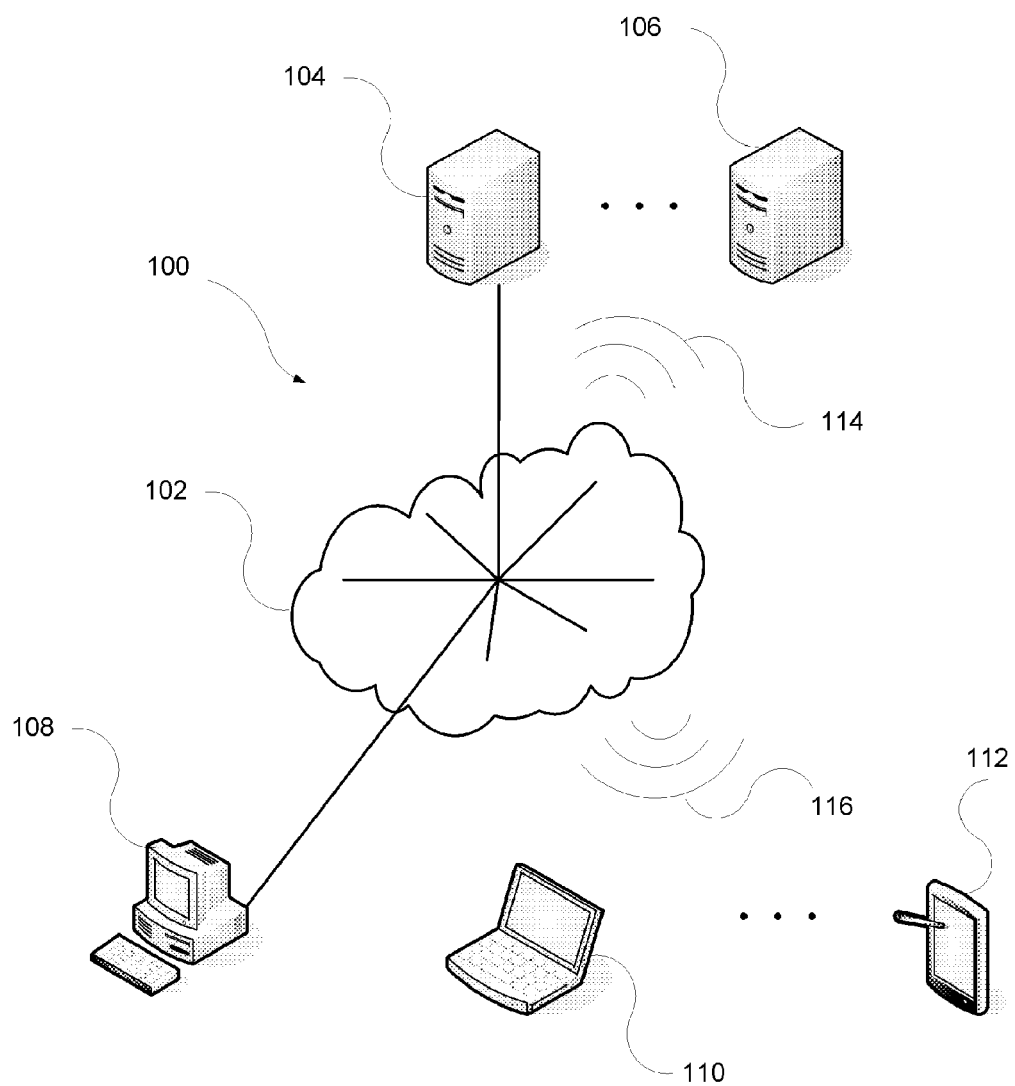
FIG. 1A illustrates a network environment where various computing devices may communicate, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other via one or more intermediate elements or components.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB), that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for enhancing an image by post-processing computations are provided. In example embodiments, a computing system may be endowed with one or more components of the disclosed apparatuses and/or systems and may be employed to perform one or more methods as disclosed herein.

Embodiments herein provide a method and system for enhancing an image with or without a large dynamic range (large difference between the darkest and lightest regions) using an image processing and enhancement technique applied to an existing image after acquisition (as opposed to enhancing the image acquisition process). A large dynamic range is not required for the disclosed methods to provide enhancement. Even images with low dynamic range can be enhanced. For example, an image that is underexposed and mostly dark or underexposed and mostly light can be enhanced by the disclosed methods to bring out details in the dark or light areas by increasing the local dynamic range. The techniques, further described below, enhance at least the contrast of pixels (picture elements) and reveal image details in overly dark regions, overly light regions, or both overly dark and overly light regions, relative to other regions, of the image and reduce the computational complexity and resources needed in existing image processing algorithms, while reducing visual artifacts, such as color fringing, low contrast, moirés, blurring, aliasing, graininess, noise, image distortion, and the like, introduced by such existing conventional algorithms.

The disclosed techniques may be used to enhance an original image, for example, improve contrast. In various embodiments, this enhancement may be done by sub-sampling the original image, identifying and/or deriving local region brightness, and using the local region brightness to enhance the contrast of pixels within these regions in the original image. Sub-sampling is generally used to reduce the number of pixels and corresponding computational load. Local region brightness is localized brightness in an image determined based on the dark and light regions within the image by, for example, using a 2-D Gaussian filter. The use of the local region brightness to enhance the image may be accomplished using a lookup table that may be configured to implement a variety of techniques, for example, contrast overlay, Alpha blending, and the like, further described below, for contrast enhancement in these regions.

FIG. 1A illustrates a network environment where various computing devices may communicate in accordance with various embodiments of present disclosures. Network environment 100 includes a computer network 102 coupling various computing devices for communication and exchange of information. Computing devices may include servers 104 and 106 coupled to network 102 by wired or wireless communications. Other computing devices, such as client devices like PC (Personal Computer) 108, laptop computer 110, PDA 112, and the like may also be coupled to each other or servers via network 102.

Generally, any computing device, which includes a network interface module may connect to network 102 and communicate with other computing devices. Such computing devices may include telephone devices, such as cell phones, satellite phones, and the like, appliances with network interface such as televisions and some refrigerators, industrial equipment and machines, cash registers, data terminals, intelligent sensors, and the like. Some computing devices may be connected to network 102 directly via a wired connection, while others may be coupled with network 102 via wireless networks 114 and 116.

Computer network 102 may be a LAN (Local Area Network), WAN (Wide-Area Network), Internet, World Wide Web, and any other computer network capable of providing communication paths and protocols for computing devices to communicate. Various protocols exist for communicating over a computer network. For example, HTTP (Hyper Text Transfer Protocol) and TCP/IP (Transmission Control Protocol/Internet Protocol) are some of the common protocols that are used for data exchange, while HTML (Hyper Text Markup Language) and ASP (Active Server Pages) are languages generally used for Web page programming and communicating over the Web.

Figure 1B:
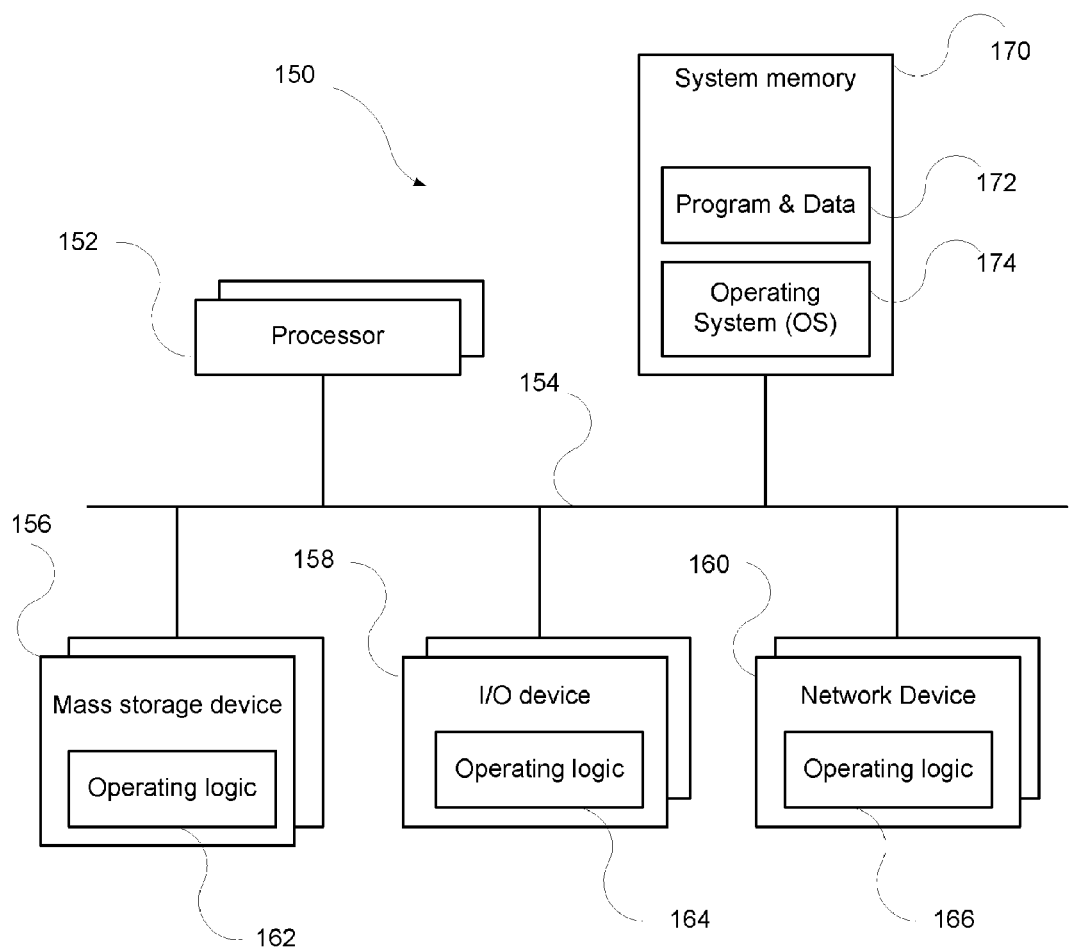
FIG. 1B illustrates details of a computing device corresponding to the computing devices of the network environment of FIG. 1A, in accordance with various embodiments.
Figure 1C:
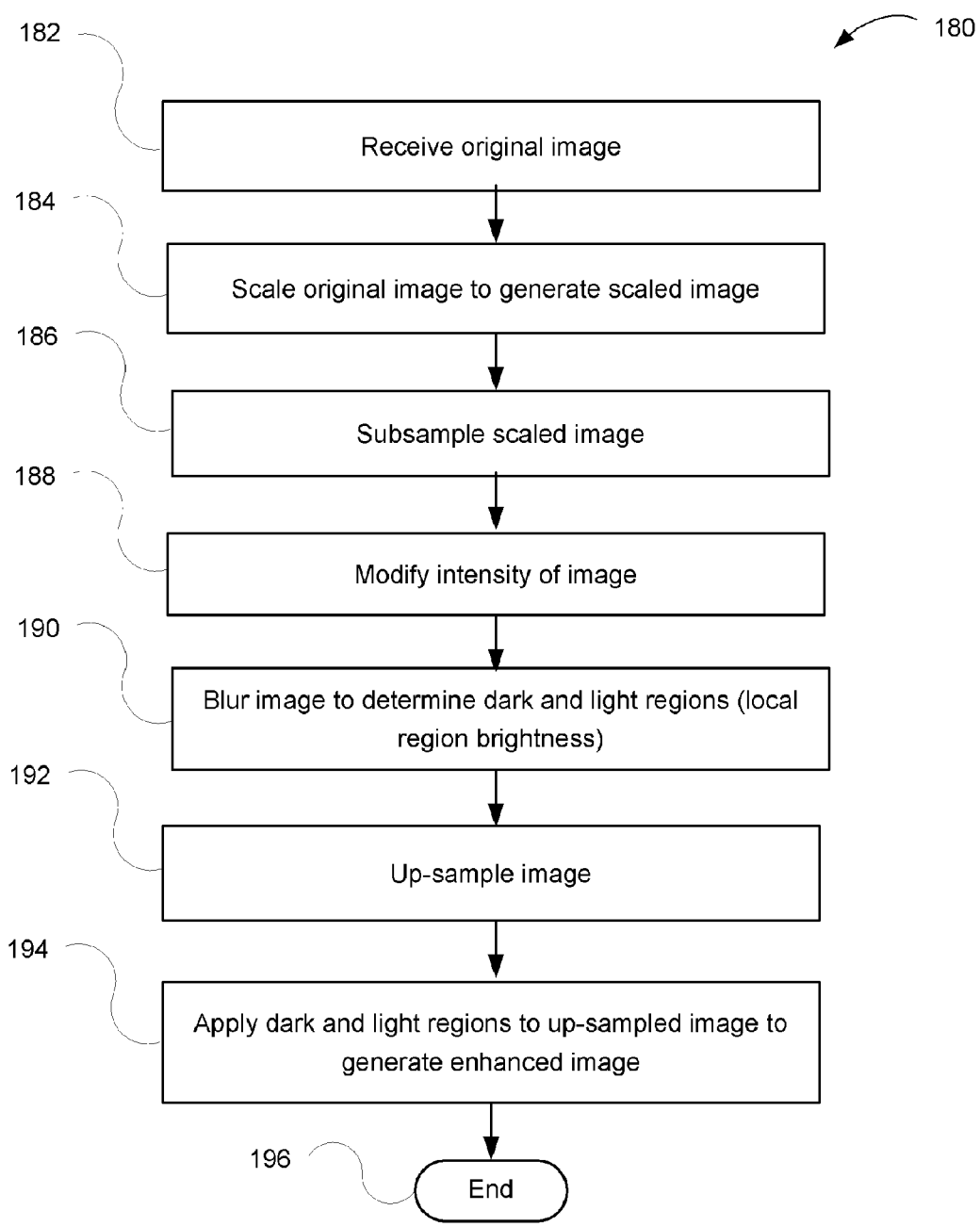
FIG. 1C illustrates a flow diagram of an example method of enhancing an image, in accordance with various embodiments.

FIG. 1B illustrates details of a computing device as shown in the network environment of FIG. 1A in accordance with various embodiments of the present disclosures. System and/or computing device 150 includes one or more processors or processor cores 152, a system memory 170, a system bus 154, mass storage devices 156, I/O (Input/Output) devices 158, and network interface devices 160. System memory 170 generally includes an OS (Operating System) for managing the operations of the computing device 150 and additional storage areas 172 for storing software application program and data. Each of the mass storage devices 156, I/O devices 158, and network interface devices 160 may also have built-in and/or locally loadable firmware to provide operating logic 162, 164, and 166, respectively. Operating logic may include various device drivers, data handling functions, data buffering, data filtering, and the like.

For the purpose of this application, including the claims, the terms "processor" and "processor cores" may be considered synonymous, unless the context clearly requires otherwise. Mass storage devices 106 may include storage devices such as diskette, hard drive, compact disc read only memory (CDROM) and so forth. I/O devices 108 may include keyboard, keypad, touchpad, display, lights, fan, camera, microphone, parallel and serial ports, for example, USB (Universal Serial Bus) port, FireWire, HDMI (High Definition Multimedia Interface), and the like. Additionally, other external I/O devices, such as scanner, video and/or still picture camera, printer, external or supplemental monitor/display, external storage devices, copier, and the like may be coupled with computing device 150 via common I/O buses such as SCSI (Small Computer System Interface), USB, serial cable, parallel cable, and the like (not shown). Network interface devices 160 may include communication devices such as wired and wireless Network Interface Cards (NIC), modems, LAN, Ethernet, and so forth. The components shown in FIG. 1B are coupled to each other via system bus 154, which may represent one or more buses, such as local bus, front-end bus, dedicated memory bus, and the like. In the case of multiple buses, the multiple buses may be coupled to each other or bridged by one or more bus bridges (not illustrated).

Each of the elements shown in FIG. 1B performs its conventional functions known in the art. In particular, system memory 170 and mass storage 156 may be employed to store a working copy and a permanent copy of the programming instructions implementing all or a portion of below described functions, herein collectively denoted as 172. The instructions 172 may be assembler instructions supported by processor(s) 152, instructions that can be compiled from high level languages, such as C, or scripting languages such as Perl.

The permanent copy of the programming instructions may be placed into permanent storage 156 in the factory, or in the field, through, for example, a distribution medium (not shown), such as a compact disc (CD), or through communication interface 160 from a distribution server (not specifically shown) over network 102 of FIG. 1A. That is, one or more distribution media having instructions 172 may be employed to distribute the instructions 172 and program various client devices. The constitution of these elements 152-174 are generally well known, and accordingly will not be further described.

In various embodiments, system 150 may be configured to operate as client device 108-112 of FIG. 1A. In various embodiments, system 150 may have a Microsoft Windows® operating system (e.g., Windows XP, Vista, etc.) or other operating systems installed. One or more instructions stored in system memory 170 and/or storage device 156 may cause system 150 to perform the methods described in the present disclosure. Client devices of FIG. 1B may be coupled with network 102 and other devices on the network via wired or wireless connections directly or through a proxy server and/or through an Internet Service Provider (ISP), indirectly.

In various embodiments, computing device (or system) 150 may also be configured to operate as servers 104 and 106 of FIG. 1A coupled with network 102 via wired or wireless NICs. Servers 104 and 106 may represent server farms including multiple server machines. Servers 104 and 106 may also include multiple software and/or virtual servers on a single hardware platform, such as internet information servers, web servers, file servers, application servers, domain name servers, routers, and the like, providing appropriate services to the client devices described above.

Although a limited number of common computing components are shown in FIG. 1B for computing device (or system) 150, those skilled in the art will appreciate that many other components may be included in computing device 150. For example, non-volatile memory, such as ROM (Read Only Memory), Flash, and the like, DMA (Direct Memory Access), multi-touch screens, math coprocessors, graphic accelerators, frame grabbers (for video capture applications), and many other devices, modules, and components may be included in a computing device. Conversely, some of the components shown in FIG. 1B may not be included in a computing device. For example, a computing device, such as a phone, may not include a mass storage device, such as a hard disk or an optical drive.

Although the components shown in FIG. 1B are shown as discrete components, those skilled in the art will appreciate that these components or their respective functions may be implemented at various levels of integration. For example, I/O device and network device interfaces 158 and 160, respectively, may implemented as one unit, such as a circuit board. Conversely, a component shown as a single module, for example, mass storage device 156, may be implemented by distributing the component's corresponding functions over multiple modules and sub-components. For example, a mass storage device may be decomposed into a storage unit and a controller unit to implement the full functionality of a storage device.

In various embodiments, computing devices and configurations shown in FIGS. 1A and 1B, and described previously, may be used in various combinations to perform the methods of the present disclosure for processing and enhancing an original image, improving contrast and detail in dark or bright regions, and reducing the need for computing time and resources for image processing by sub-sampling the original image, while avoiding the introduction of visual artifacts as a result of the image processing. For example, the entire image enhancement process may be implemented in one computing device, such as a PC, or the process may be implemented using a combination of multiple PCs, servers, copiers, scanners, and the like, each one or more of such computing devices performing one or more specialized tasks. For example, in an embodiment, one PC may be used to receive an original image from a scanner, a database, or other data storage facility, sub-sample the image and send the sub-sampled image to an image processing server, where the local region brightness of the sub-sampled image is derived and sent back to the one PC to be applied to the original image for enhancement.

Now more specific aspects of the present disclosure are described. Such aspects may be implemented, at least in part, using one or more of the devices and/or computing environments described earlier with respect to FIGS. 1A and 1B.

FIG. 10 illustrates a flow diagram of an example method of enhancing an image, in accordance with various embodiments. The overall image enhancement process 180 is now described with reference to FIG. 10. The image enhancement process may include some or all of the steps described below. In some embodiments, some of the steps in the process may be optional. For example, scaling of the original image may not be necessary if normalization is not desired or does not significantly contribute to the enhancement of a particular image or type of image.

Process 180 starts at block 182 where an original image is received. The original image may come from many sources. The process proceeds to block 184. At block 184, the original image is optionally scaled or normalized to standardize image brightness, as described later at least with respect to FIG. 2.

Each pixel is proportionally scaled such that the brightest pixel in the original image is assigned the highest value in the numerical representation of pixel intensity. The process continues to block 186. In various embodiments, partial scaling may also be applied to the image in addition to the described full normalization.

At block 186, the scaled image from block 184 is sub-sampled according to the techniques described later at least with respect to FIG. 2. The sub-sampled image generally needs significantly less storage space to store than the original image, thus reducing storage and computational needs during the image enhancement process. The process continues to block 188.

At block 188, the intensity of each pixel in the sub-sampled image is modified to reflect the maximum intensity of each of the color planes for each pixel, as described later (for example, equation (2)). Storage needs for a single intensity value are significantly less than those for three intensity values, one for each color plane. Additionally, the pixel intensity so obtained generally provides a perception of a clearer and higher quality image. The process proceeds to block 190.

At block 190, one of a number of filtering techniques, such as the Gaussian blur filter described later (for example, equation (4),) is used to blur the sub-sampled and intensity-modified image to derive or generate the image base layer allowing identification and/or determination of dark and bright regions. As described herein and further described later at least with respect to FIG. 2, the image base layer is used to enhance the dark and bright regions of the original image by various mapping techniques described later at least with respect to FIG. 4. The process proceeds to block 192.

At block 192, the image base layer is up-sampled based on one of a number of techniques described later at least with respect to FIG. 3. Up-sampling is done to restore the resolution of the image base layer to the resolution of the original image. This restoration enables the application of the image base layer to the original image on a pixel-by-pixel basis. The process proceeds to block 194.

At block 194, the up-sampled image base layer (or up-sampled intermediate image) is applied on a pixel-by-pixel basis to the original image to generate the enhanced image. The application of the up-sampled image base layer may be based on mappings implemented as a look-up table or using equations describing the mappings, as described later (for example, equations (5) and (6)). In various embodiments, the application of the up-sampled image base layer may be based on conditional inversion of pixel intensity, as further described later. The process terminates at block 196.

Figure 2:
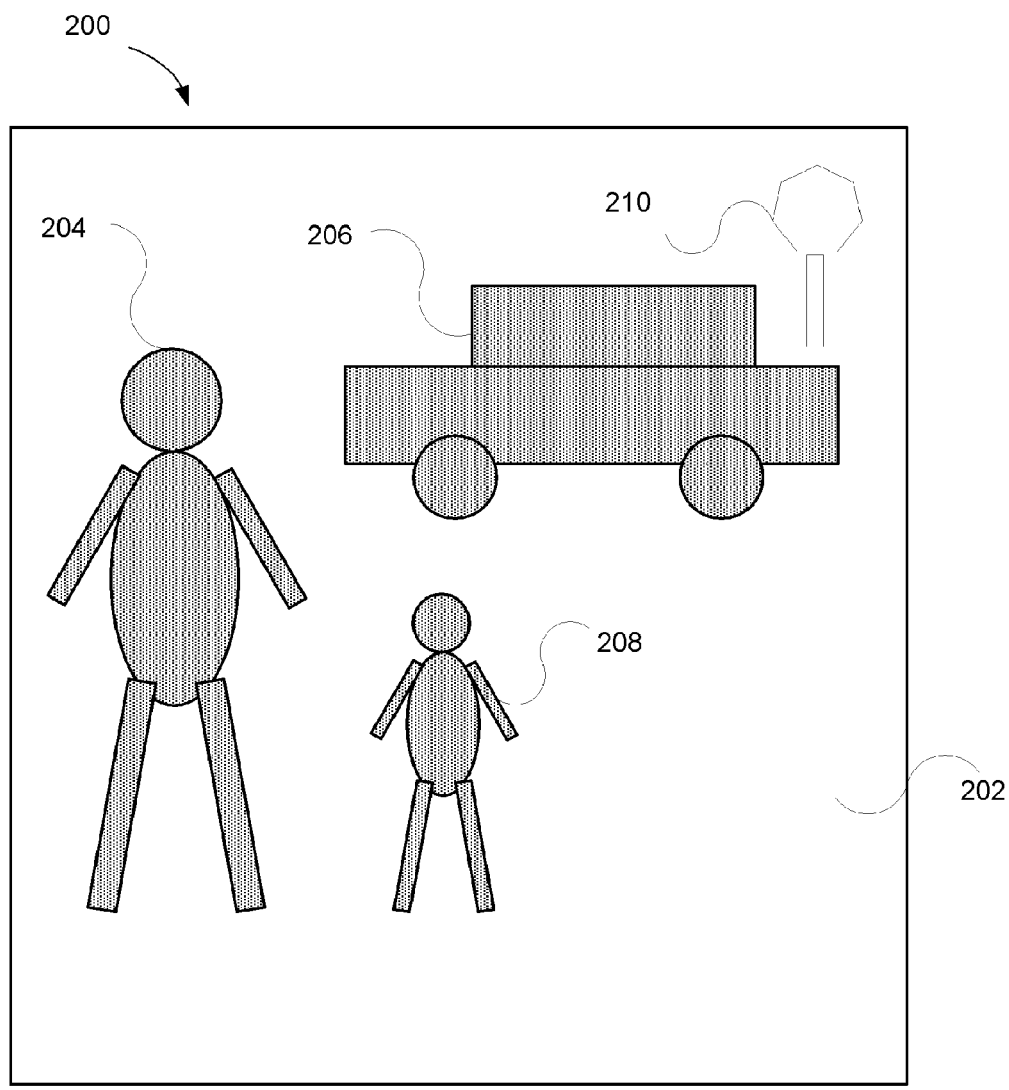
FIG. 2 illustrates an original image suitable for processing using various embodiments.

FIG. 2 illustrates an original image suitable for processing using various embodiments in accordance with the present disclosure. Example image 200 shows an adult 204, a child 208, and a car 206 against a bright background 202 with a sign post 210. The objects and people in this example image are seen substantially as shadows (dark regions of the image) with little of their internal details being visible. Background 202, in example image 200, is seen as highlight (bright region of the image), with "washed out" details (not shown.) Such washed out images are common when a picture is taken/captured against a bright background or other bright light source in the scene, where the photographic equipment, for example, a video or still image camera, adjusts exposure according to the bright region or background light level, under-exposing the objects and/or people in the foreground and obscuring the colors and details of the foreground objects/people.

This is a typical example of poor image quality that can occur in a typical mixed lighting situation. In this example, the well lit background (for example, the outdoors) results in an exposure setting that causes the details of the darker foreground objects (people and car) to be obscured. In addition, the exposure compensation for the dark foreground objects causes brightly lit objects in a brighter image segment or the background (for example, trees and buildings—not shown) to become "washed out" or over-exposed, leaving faint colors/features and pixels with low-contrast, delivering a double reduction in final quality: under-exposed or dark objects/regions (for example, foreground objects and people) and over-exposed or bright objects/regions (for example, background objects.)

Given an original image with lighting characteristics described previously, the image enhancement techniques and algorithms further described herein may be used to enhance the contrast within the dark and bright regions, revealing more of the details in such regions. These image enhancement and processing techniques include one or more of the following techniques. One or more of such techniques may be used to enhance an image, as further described below. One technique for image enhancement is the calculation of color image intensity using a maximum value from multiple color channels (for example, Red, Green, Blue or RGB). Another technique is image sub-sampling for use in intensity image base layer derivation. Another technique is the application of a multi-scale filter, such as a two-dimensional (2-D) Gaussian filter, to the sub-sampled image to blur the sub-sampled image and derive local region brightness (image base layer). Still another technique is the configurable application of the image base layer to enhance image quality in shadow (dark) and highlight (bright) regions. Another technique is the, use of configurable/programmable hardware for shadow and/or highlight enhancement.

As a pre-processing step, the original image may be normalized, for example, by scaling or stretching in terms of light intensity, so that the brightest pixel in the image is assigned the maximum value possible in a binary representation of a pixel. For example, if an 8-bit binary value is used to represent each pixel, then the brightest pixel is assigned the value 255 which is the maximum value possible of an 8-bit binary word. The rest of the image pixels are scaled proportionally to assume their respective normalized values. Generally, normalization of quantities may be done to standardize the scale used to analyze such quantities, thus, simplifying the analysis.

One technique to reduce the amount of computational time, complexity, and resources needed to process an image is to sub-sample the image to reduce the number of pixels that need to be processed. Sub-sampling an image, in effect, reduces the resolution of the image without removing any integral portion or chunk of the image. Sub-sampling may be done using various techniques. In various embodiments, one method of sub-sampling selects or samples every N-th pixel of the image from a linear sequence of all pixels in the image, for some integer constant N, such as 2, 4, or 8. Another method of sub-sampling averages the values of N neighboring pixels to form one super-pixel replacing the N pixels. For example, a grid of 4×4 pixels may be averaged to form one pixel replacing the grid of pixels.

If the pixels in an image are modeled as a two-dimensional X-Y grid, then another method of sub-sampling an image samples every M-th pixel in the X direction and samples every N-th pixel in the Y direction of the X-Y grid, where M and N are integer constants. The sub-sampled image will include the pixels that were sampled both in the X and Y direction. In effect, this method is an area-based sampling method as opposed to a linear sequential sampling method.

For example, with M=2 and N=2, an area-based sub-sampling will sample every other pixel in every other row and every other column. Area-based sampling may include box-averaging the sub-sampled pixels (i.e., replacing each pixel with the average value of pixels in the same predefined neighborhood containing each pixel). Any type of sub-sampling of a signal or a sequence of quantities (such as pixels, in this case) may cause aliasing due to violation of the Nyquist sampling criteria. A signal is sampled at least at twice the bandwidth of the signal to avoid aliasing. Aliasing occurs if two different sampled signals become indistinguishable due to low sampling rate. Therefore, values for M and N should be chosen carefully to avoid aliasing problems.

Random sub-sampling, with certain constraints on the range of random numbers to prevent skipping too many pixels in the process, may also be used in some embodiments. Another method uses a combination of sampling every N-th (or every M-th and N-th in area-sampling methods) pixel and further averages the values of the sub-sampled pixels in a defined neighborhood of pixels to generate a sub-sampled image from the original image. Yet another method of sub-sampling uses a combination of some or all of the above methods.

The sub-sampling methods discussed above may be applied to a normalized image or to an original image and are not strictly dependent on an image which is normalized.

As noted above, image sub-sampling is a procedure used to reduce the amount of data needed to represent an image, thereby reducing computational load for processing such image. The sub-sampled image may be used for extraction of an image "base layer" which includes dark and light regions corresponding to the original image but with less detail than the original image. This image base layer is calculated and stored at a substantially reduced resolution compared to the original image. However, the image base layer is used in a way, further described herein, that allows the original full image details and resolution to be preserved while enhancing the shadow and highlight areas of the image. The use of this image base layer may greatly reduce the amount of storage and calculations required in other steps of the image enhancement process without substantially sacrificing output image enhancement quality.

When processing color images, it is often necessary to calculate a perceived intensity of the image at each pixel location. The goal is to model the Human Visual System's (HVS) perceived intensity of the image. This information can be used to control the type and amount of adjustment that will be performed on the image. The perceived intensity is an important component for a variety of image processing/enhancement algorithms. For example, perceived intensity can be used to control the amount of contrast enhancement applied to an image to correct for under or over exposed regions. In one embodiment, the calculation of perceived intensity is based on a linear conversion of the multiple color space data values (for example, Red color values or Green color values) into a single intensity value. For example, a pixel with RGB data values is typically converted to a single intensity value based on a weighted linear combination of RGB values, such as:

$$\text{Image Intensity} = A*R + B*G + C*G \quad (1)$$

where A, B, and C are weights or coefficients/multipliers for the Red (R), Green (G) and Blue (B) data values. The weights may be assigned based on various criteria. For example, if a particular basic color, such as red (R, in RGB), has higher variability and/or range in an image, then the weight of the particular basic color may be increased to make it the dominant intensity based on which the image intensity is determined, because higher variability may improve contrast.

In practice, a variety of different fractional weights are proposed and used and the weights normally sum to 1.0. However, in some cases, more complex (for example, non-linear) combinations of the individual, and/or neighboring, color plane values may also used.

In another embodiment, rather than calculating the perceived intensity of the image based on a linear combination of the individual color planes, the maximum value across all color planes may be used to represent the intensity for each pixel. This is generally a simpler value to calculate, and it also may provide superior results for image enhancement algorithms that require an estimate of perceived intensity which indicates the amount of illumination for each pixel. For example, the Intensity of an RGB pixel may be calculated as follows:

$$\text{Pixel Intensity} = \text{Maximum}(R, G, B) \quad (2)$$

where R, G, and B represent pixel values for each of the red, green, and blue color planes, respectively. The Maximum <> function returns the maximum value of its three arguments compared to each other on a per-pixel basis. For example, Maximum(98,210,143)=210.

In this embodiment, when a color scene is captured as an image, the amount of illumination applied to the scene directly affects the maximum value captured for each color plane. The relative amount of color in each plane is not important in determining the overall illumination, only the maximum from the available planes. This embodiment assumes a white light source, or the correction of a non-white light source prior to calculation of the intensity. Using this technique the amount of storage required to store the intensity of each pixel is reduced by $2/3$, and, according to empirical evidence, the perceived quality of the resulting image generally improves over the original image.

The pixel intensity calculations and techniques discussed above may be applied to a normalized and/or sub-sampled image or to an original image, and are not strictly dependent on an image which is so pre-processed.

It is noteworthy that images may be based on RGB representation of color data or based on a number of other representations, such as R'G'B', YUV, YIQ, YCbCr, PhotoYCC®, and the like. These various representations, sometimes referred to as color spaces, are convertible to other representations. For example, YCbCr, where Y is the luma or intensity and Cb and Cr represent color components of an image, is commonly used to represent images. An 8-bit digital YCbCr representation is convertible to R'G'B', and vice versa, using the following equations:

$$Y = 0.299\, R' + 0.587 G' + 0.114 B' \quad (3a)$$

$$Cb = -0.172\, R' - 0.339\, G' + 0.511\, B' + 128 \quad (3b)$$

$$Cr = 0.511\, R' - 0.428\, G' - 0.083 B' + 128 \quad (3c)$$

where the offset "128" is half the maximum intensity possible in an 8-bit quantity. The coefficients are determined based on the relationship between the respective color space coordinates.

Therefore, the processes described herein are equally applicable regardless of the image representation chosen or available, because as noted above, these various representations may be converted to other representations. For brevity and clarity, only RGB representation of images is used for discussion in this disclosure.

Figure 3:
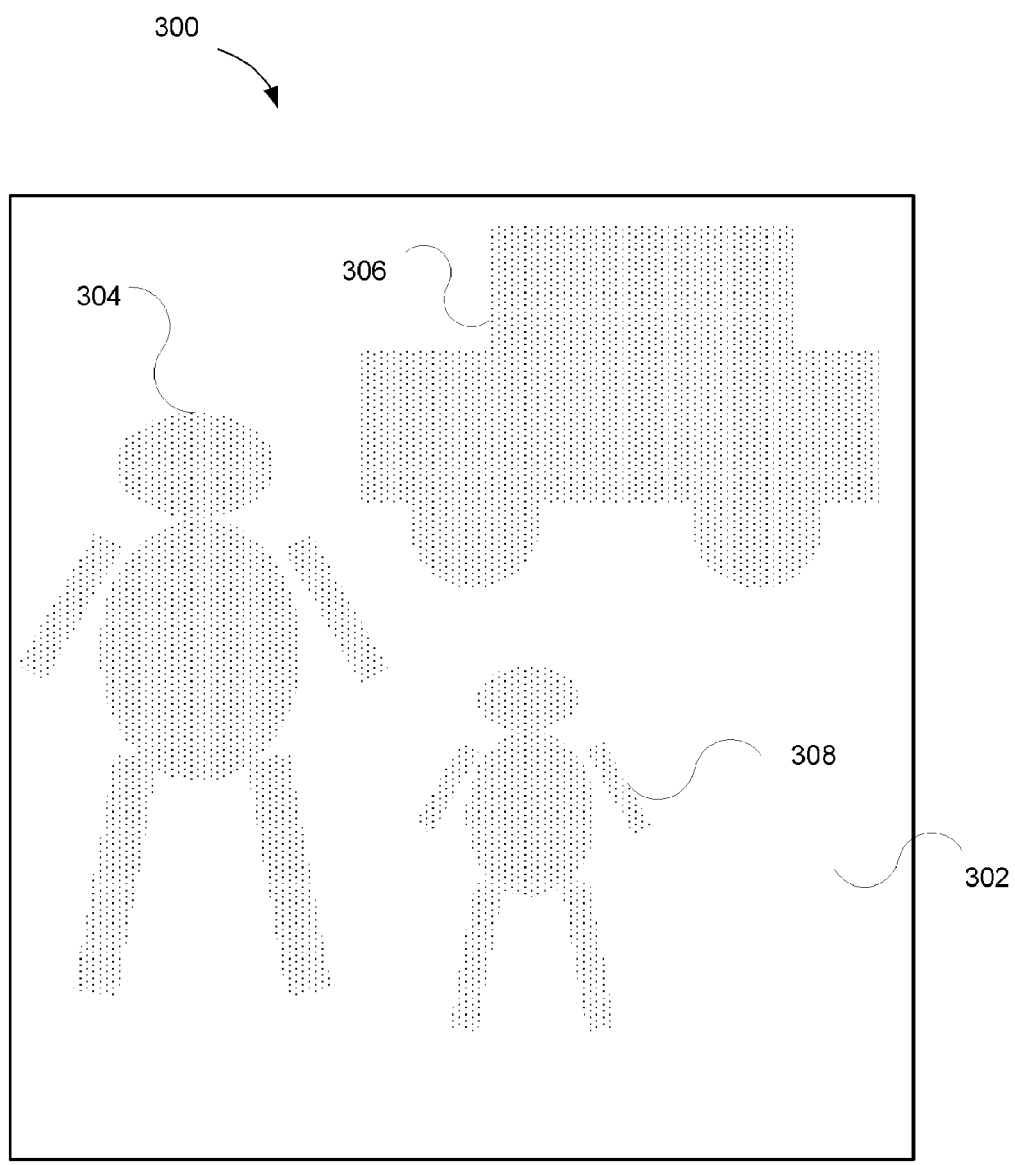
FIG. 3 illustrates a blurred version of the original image of FIG. 2, in accordance with various embodiments.

FIG. 3 illustrates a blurred version of the original image of FIG. 2 in accordance with various embodiments. Blurred image 300 includes the same elements as original image 200, but in blurred form, and with less detail than the original image 200. An adult 304, a child 308, a car 306, and a background 302 are still visible in the blurred image 300. Blurring is one of the techniques used in the image enhancement process disclosed herein to enhance the details in the shadow and highlight regions, as further described below. In this example, blurred image 300 depicts original image 200 after the application of the blurring process. The foreground objects and/or people, that is, adult 304, child 308, and car 306, constitute the dark or shadow regions of image 300, while background 302 constitutes the highlight or bright regions of the image.

As noted above, one aspect of enhancing shadow and highlight regions of an image is the ability to determine which regions are shadows and which regions are highlights. Generally, this determination may not be possible at pixel-level, that is, by examination of individual pixel values, since the scene details in the image may include both light and dark objects in both shadow and highlight regions. In various embodiments, one technique to reduce the image to "regions" is to apply a strong region based blur to the original image. This technique effectively reduces local detail leaving behind the relatively broader lighting information. For example, this approach may include applying a typical box-averaging blur (i.e., replacing each pixel with the average value of pixels in the same predefined neighborhood containing each pixel) to the image. This technique may remove edge detail between shadow, highlight, and medium regions of the image. Using this technique for further shadow/highlight enhancement may result in visible image artifacts at/near these edges.

Another approach is to use an edge-preserving blur such as a bi-lateral filter. These types of filters are generally expensive in terms of computational resources and when used in conjunction with base-layer sub sampling, they may produce visible image artifacts.

In another embodiment, by applying a specially designed multi-scale Gaussian blur filter to the sub-sampled image, where the image is convolved (in a convolution operation) with a Gaussian function, an image base layer may be generated that estimates local region brightness without excessive computational complexity and with sufficient preservation of shadow, highlight, and medium brightness edges to avoid visible enhancement artifacts when using the "base-layer" for shadow/highlight image enhancement. The multi-scale Gaussian filter is also compatible with the sub-sampling approaches described above, which allows large regions of the image to be averaged without an excessive filter size. For example, a 21×21 Gaussian filter, which is described by the following equations, may be suitable for most images.

$$g(x, y, \sigma) = e^{-(x^2+y^2)/(2\sigma^2)} \quad (4a)$$

$$h(x, y, s) = \frac{g(x, y, s/6)}{\sum_{x=0}^{x=s} \sum_{y=0}^{y=s} g(x, y, s/6)}; \quad (4b)$$

for $x$ and $y < s$; otherwise $h(x, y, s) = 0$;

$$\text{filter}(x, y) = \frac{h(x, y, 21) + h(x, y, 9) + h(x, y, 3)}{3} \quad (4c)$$

Where g( ) is the 2-D (two dimensional) Gaussian function, x and y are variables in the X and Y directions of the image grid, respectively, Cf is the standard deviation, and h( ) is the transfer function.

The constants in equations 4a-4c are numbers determined from empirical experimentation and analysis of the resultant image quality and computational complexity. In various embodiments, these constants are used as values that give good image quality results without introducing excessive computational complexity. In other embodiments, larger values may be used to gain a small improvement in image quality for a large increase in computational complexity and/or time. Specifically, the constants 3, 9, and 21 determine the extent/size of three Gaussian filters that are combined to create a multi-scale Gaussian filter. As shown in the equations, each of the filters produces a zero value outside its "s" value (i.e., x and $y \geq s$, equation 4(b)). The constant 6 is a standard value used in digital Gaussian filtering, essentially, creating a Gaussian filter that tails off to zero at the extent of "s" value.

The image base layer so obtained may be used in a later stage of the image enhancement process to improve pixel contrast and image quality in the enhanced image.

The sub-sampled and blurred image described above constitutes an intermediate image that may be stored, for example, to the mass storage device 156 of FIG. 1B, for subsequent use. Due to the sub-sampling and pixel intensity modification (for example, as shown in equation (2)) of the pixels in the original image, the storage of the sub-sampled and blurred image may only utilize about 1/100 to 1/200 times the storage space of the original image, depending on the sub-sampling and blurring techniques and parameters used. To obtain the resolution of the original image in an enhanced image (resulting from the image enhancement process,) "up-sampling" of pixels in the saved intermediate image may be performed, whereby the same of number of pixels as the original image is restored to allow a pixel-by-pixel application of the image base layer to the original image and generate the enhanced image.

Generally, the up-sampling of the intermediate image (resulting in an up-sampled intermediate image) that is needed to restore the original image resolution (or number of pixels) is computationally relatively inexpensive and can be done "on the fly" or dynamically as both the original image and saved intermediate image (i.e., the sub-sampled and blurred image) are scanned for further processing, such as applying up-sampling. Up-sampling may be applied using different techniques including interpolation of values of adjacent pixels, bilinear interpolation of values of pixels on a grid (a two-dimensional interpolation), and non-linear region-growing techniques whereby the number of pixels are "grown" within an image segment based on various criteria, such as frequency distribution and other image characteristics.

Figure 4:
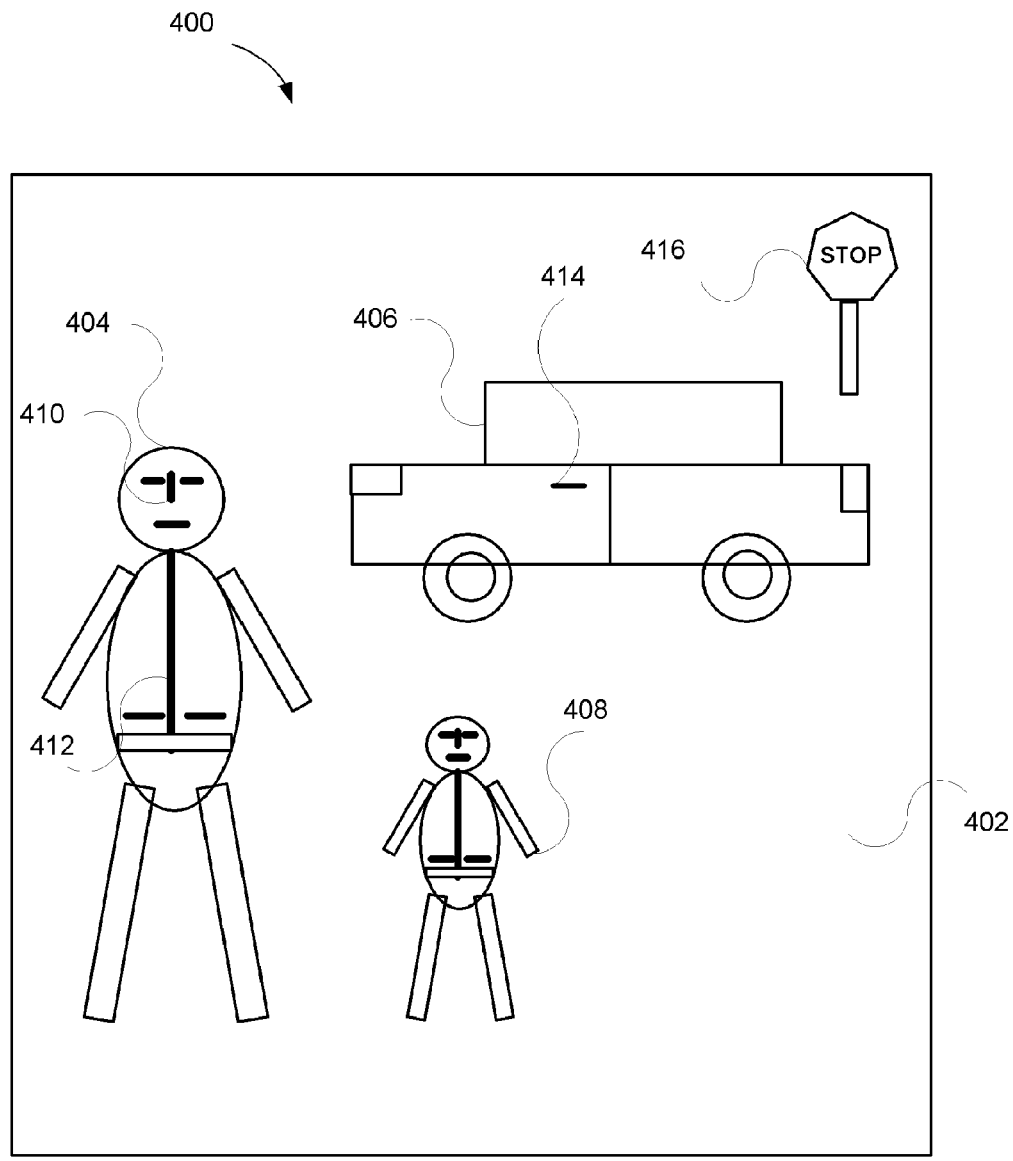
FIG. 4 illustrates an enhanced version of the original image of FIG. 2, in accordance with various embodiments.

FIG. 4 illustrates an enhanced version of the original image of FIG. 2 in accordance with various embodiments. Like blurred image 300 of FIG. 3, enhanced image 400 of FIG. 4 has the same elements of original image 200 of FIG. 2, namely, an adult 404, a child 408, a car 406, and a background 402 with a stop sign post 416. However, the enhanced image 400 has more visible details and better contrast in the shadow and bright areas. In this example, the more visible details in the foreground of the image include facial features 410 and clothing features 412 of adult 404, and some details of car 406, such as door handle 414. Enhanced image 400 is an example of the result of applying the image enhancement process, as further described below. Stop sign 416 is an example of enhanced details in the bright background 402.

The text "STOP" on stop sign 416 that was not visible on sign post 210 of FIG. 2, is enhanced and has become visible in the enhanced image 400.

The application of the derived local region brightness, as estimated by and embodied in the image base layer, to the original image using a mapping (further described below), provides the enhancement of shadow and highlight regions, and generates the enhanced image. Generally, for contrast and detail enhancement in dark and bright regions of an image, the contrast of pixels (i.e., difference between a pixel and the background or surrounding pixels), in both shadow (or dark) and highlight (or bright) regions, should be increased. To increase the contrast in shadow regions, pixels lighter than the base layer are made brighter. To increase the contrast in highlight regions, pixels darker than the base layer are made darker. The determinations of how much modification should be made to each pixel value, what level of brightness constitutes a highlight or shadow, and how to smoothly transition the enhancement between various shadow, highlight, and medium regions affect the final enhancement results. Such determinations may be made based on user preferences, predetermined empirical criteria, feedback process, and the like, whereby parameters are adjusted until a satisfactory result is obtained.

A relatively large variety of techniques are available to map pixels in the up-sampled image base layer to pixels in the original image. These mapping techniques are applied using the original pixel value and the image base layer to compute a new value for an output pixel, resulting from a sequence of transformations of pixels, as described herein in terms of the image enhancement process, and to convert the original image to the enhanced image.

In various embodiments, an example "contrast overlay" mapping may be used. This mapping is applied using the following equations where "B" is the value from the extracted image base layer, "I" is the original image, "inverse(x)" is the negative or inverse of a value x (for example, inverse (x)=1−x), and "Iout" is the intensity of the output or resultant pixel (in the enhanced image). This mapping implements a conditional inversion of output pixel intensity based on the range of values of I in the original image.

$$Iout = I*2*B; \text{ For } I < 0.5 \tag{5a}$$

$$Iout = \text{inverse}(\text{inverse}(I)*\text{inverse}(B)*2); \text{ For } I > 0.5 \tag{5b}$$

Another example mapping is an Alpha-blend mapping implemented using the following equation. Alpha-blending is generally used for inducing a level of transparency in an image, where a higher level of alpha indicates more transparency. Alpha generally varies between 0 and 1, where 0 corresponds to complete transparency and 1 corresponds to complete opacity.

$$Iout = I*(B + \text{inverse}(B)*(k/(B + \text{offset}) + 1 - k)), \tag{6}$$

where k is the alpha value that varies between 0 and 1.

Typical values for the above parameters are: offset=0.2; k=0.5; these values can be varied to change the amount and/or type of enhancement. For example, increasing the value of k towards 1 increases intensity and/or contrast of shadow and bright regions in the enhanced image.

Other example mappings are possible for applying the derived local region brightness to the original image. The optimal mapping is dependent on the original image characteristics, the output media for the final enhanced image, the personal preference of the user, and a variety of other factors. Rather than selecting a fixed mapping, a technique may be implemented that allows an efficient application of a variety of mappings by using a look-up table that produces a scaling multiplier or coefficient value for each original image pixel. The look-up table is indexed by the derived local region brightness in the image base layer. At the indexed location, a multiplier is obtained from the look-up table and applied separately to each color plane in the original image to maintain the original color hue while enhancing the shadow and highlight detail. This look-up table approach allows implementation of both example mappings above.

The multiplication of original image pixels by the multiplier obtained from the look-up table, or otherwise from the example mappings, complete the application of image base layer to the original image, resulting in the enhanced image having better contrast and details of pixels in the dark and bright regions.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiments discussed herein. Therefore, it is manifestly intended that embodiments be limited only by the claims and the equivalents thereof.

What is claimed is:

1. A method of enhancing an image, the method comprising:
   sub-sampling, by a processor, an original image to generate a sub-sampled image having sub-sample pixels;
   obtaining, by the processor, a maximum intensity for each of the sub-sample pixels;
   blurring, by the processor, the sub-sampled image to generate an image base layer based upon the maximum intensities of the sub-sample pixels;
   identifying, by the processor, dark and bright regions within the image base layer; and
   applying, by the processor, the dark and bright regions to the original image to enhance a contrast of pixels within the original image.

2. The method of claim 1, further comprising scaling, by the processor, the original image.

3. The method of claim 1, further comprising up-sampling the image base layer.

4. The method of claim 1, wherein the blurring is effected using a two-dimensional 21×21 Gaussian blur filter.

5. The method of claim 1, wherein applying the dark and bright regions comprises conditionally inverting an intensity level of pixels in the original image.

6. The method of claim 1, wherein applying the dark and bright regions comprises conditionally inverting an intensity level of pixels in the image base layer.

7. The method of claim 1, wherein obtaining a maximum intensity comprises obtaining a maximum intensity from intensities of each of three Red-Green-Blue (RGB) color planes of each of the sub-sample pixels.

8. An apparatus for enhancing an image, the apparatus comprising:
- a processor configured to execute instructions; and
- a storage device, coupled with the processor, the storage device having instructions stored thereon that when executed cause the apparatus to
  - sub-sample an original image to generate a sub-sampled image having sub-sample pixels,
  - obtain a maximum intensity for each of the sub-sample pixels,
  - blur the sub-sampled image to generate an image base layer based upon the maximum intensities obtained from the sub-sample pixels,
  - identify dark and bright regions within the image base layer, and
  - apply the dark and bright regions to the original image to enhance a contrast of pixels within the original image.

9. The apparatus of claim 8, wherein the instructions stored on the storage device, when executed, further cause the apparatus to scale the original image.

10. The apparatus of claim 8, wherein the instructions stored on the storage device, when executed, further cause the apparatus to access a look-up table based on a pixel value from the image base layer to obtain a scaling factor.

11. The apparatus of claim 8, wherein the instructions stored on the storage device, when executed, further cause the apparatus to apply the dark and bright regions to the original image based on a contrast overlay mapping.

12. The apparatus of claim 8, wherein the instructions stored on the storage device, when executed, further cause the apparatus to apply the dark and bright regions to the original image based on an Alpha-blend mapping.

13. The apparatus of claim 8, wherein the instructions stored on the storage device, when executed, further cause the apparatus to up-sample the image base layer.

14. The apparatus of claim 8, wherein the instructions stored on the storage device, when executed, further cause the apparatus to apply the dark and bright regions to the original image based on conditional inversion of an intensity of pixels in the original image.

15. A method of enhancing an image, the method comprising:
- obtaining, by a processor, a maximum intensity for each of a plurality of pixels in an original image;
- blurring, by the processor, the original image to generate an image base layer based upon the maximum intensities obtained from the plurality of pixels;
- identifying, by the processor, dark and bright regions within the image base layer; and
- applying, by the processor, the dark and bright regions to the original image based upon at least one of a plurality of techniques stored within a table, the plurality of techniques configured to enhance a contrast of pixels within the original image.

16. The method of claim 15, further comprising scaling, by the processor, the original image based on assignment of a maximum value to a brightest pixel in the original image.

17. The method of claim 15, further comprising sub-sampling, by the processor, the original image based on a two-dimensional sampling process including box averaging.

18. The method of claim 15, further comprising up-sampling, by the processor, the image base layer.

19. The method of claim 15, wherein applying the dark and bright regions comprises using a look-up table indexed by pixel values in the image base layer.

20. The method of claim 15, wherein applying the dark and bright regions to the original image based upon at least one of a plurality of techniques comprises using at least one of a contrast overlay technique and an Alpha-blending technique.

* * * * *